(12) United States Patent
Stöckle

(10) Patent No.: US 11,274,647 B2
(45) Date of Patent: Mar. 15, 2022

(54) METHOD FOR REGULATING THE TEMPERATURE OF A GLOW PLUG

(71) Applicant: BorgWarner Ludwigsburg GmbH, Ludwigsburg (DE)

(72) Inventor: Jörg Stöckle, Ludwigsburg (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 478 days.

(21) Appl. No.: 16/033,589

(22) Filed: Jul. 12, 2018

(65) Prior Publication Data

US 2019/0017488 A1    Jan. 17, 2019

(30) Foreign Application Priority Data

Jul. 14, 2017   (DE) ...................... 10 2017 115 946.0

(51) Int. Cl.
*F02P 19/02*   (2006.01)
*G05D 23/24*   (2006.01)
*F23Q 7/00*    (2006.01)

(52) U.S. Cl.
CPC ........... *F02P 19/025* (2013.01); *F02P 19/028* (2013.01); *G05D 23/2401* (2013.01); *F23Q 7/001* (2013.01); *F23Q 2007/002* (2013.01)

(58) Field of Classification Search
CPC .. G05D 23/2401; F02P 19/028; F02P 19/025; F02P 19/002; F23Q 7/001; F23Q 2007/002
USPC ...................................................... 219/270
See application file for complete search history.

(56) References Cited

U.S. PATENT DOCUMENTS

| | | | | |
|---|---|---|---|---|
| 4,283,619 A | * | 8/1981 | Abe ...................... | F02P 19/025 123/179.21 |
| 4,285,307 A | * | 8/1981 | Steinke .................. | F02P 19/02 123/145 A |
| 4,500,775 A | * | 2/1985 | Sangu ................... | F02P 19/027 123/145 A |
| 4,658,772 A | * | 4/1987 | Auth ..................... | F02P 19/026 123/145 A |
| 4,669,430 A | * | 6/1987 | Reinold ................ | F02P 19/021 123/145 A |
| 4,694,145 A | * | 9/1987 | Romstadt .............. | F02P 19/025 123/179.21 |

(Continued)

FOREIGN PATENT DOCUMENTS

DE    10 2007 000 789 A1    4/2008
DE    10 2012 211 641 A1    1/2014

(Continued)

*Primary Examiner* — Eric S Stapleton
(74) *Attorney, Agent, or Firm* — Bose McKinney & Evans LLP

(57) ABSTRACT

Described is a method for regulating the temperature of a glow plug of an internal combustion engine, wherein a target resistance is determined from a target temperature by means of a resistance temperature characteristic of the glow plug and the actual resistance of the glow plug is regulated to the target resistance, the glow plug is heated to determine the resistance temperature characteristic of the glow plug, and thereby determining a resistance gradient and an electrical resistance of the glow plug is measured before the heating or at a defined time during the heating, using both the measured resistance and the resistance gradient, the resistance temperature characteristic is determined.

15 Claims, 4 Drawing Sheets

(56) References Cited

U.S. PATENT DOCUMENTS

| | | | | |
|---|---|---|---|---|
| 4,726,333 A * | 2/1988 | Verheyen | F02P 19/025 | 123/145 A |
| 4,858,576 A * | 8/1989 | Jeffries | F02P 19/025 | 123/145 A |
| 4,862,370 A * | 8/1989 | Arnold | F02D 41/062 | 701/113 |
| 4,893,315 A * | 1/1990 | Homer | G01N 25/28 | 110/186 |
| 4,939,347 A * | 7/1990 | Masaka | F02P 19/022 | 123/179.6 |
| 5,122,968 A * | 6/1992 | Bauer | F02P 7/035 | 123/145 A |
| 5,144,922 A * | 9/1992 | Kong | F02P 19/025 | 123/145 A |
| 5,307,701 A * | 5/1994 | Thonnard | F02B 9/06 | 123/145 A |
| 5,724,932 A * | 3/1998 | Antone | F02P 19/021 | 123/145 A |
| 5,729,456 A * | 3/1998 | Boisvert | F02P 19/021 | 123/179.21 |
| 6,009,369 A * | 12/1999 | Boisvert | F02P 19/026 | 123/145 A |
| 6,148,258 A * | 11/2000 | Boisvert | F02P 19/022 | 123/145 A |
| 6,658,931 B1 * | 12/2003 | Plumb | G01F 1/698 | 73/204.15 |
| 7,214,909 B2 * | 5/2007 | Reiter | G01K 15/00 | 219/448.11 |
| 7,319,208 B2 * | 1/2008 | Gotoh | F23Q 7/001 | 219/270 |
| 7,431,004 B2 * | 10/2008 | Kernwein | F02P 19/027 | 123/145 A |
| 7,957,885 B2 * | 6/2011 | Kernwein | F02P 19/026 | 701/102 |
| 8,423,197 B2 * | 4/2013 | Sakurai | F02P 19/025 | 700/296 |
| 8,552,751 B2 * | 10/2013 | Kernwein | F02P 19/022 | 324/693 |
| 8,826,729 B2 * | 9/2014 | Moritz | F02P 17/00 | 73/114.58 |
| 8,976,505 B2 * | 3/2015 | Kernwein | F02P 19/025 | 361/264 |
| 9,134,180 B2 * | 9/2015 | James | G01J 5/061 | |
| 9,163,605 B2 * | 10/2015 | Sackmann | F02P 19/025 | |
| 9,329,604 B2 * | 5/2016 | Sackmann | G05D 23/19 | |
| 9,822,755 B2 * | 11/2017 | Toyoshima | F02P 19/027 | |
| 10,132,288 B2 * | 11/2018 | Joos | F02P 19/021 | |
| 2001/0050275 A1 * | 12/2001 | Uhl | F02P 19/021 | 219/270 |
| 2004/0255889 A1 * | 12/2004 | Kumada | F02P 19/022 | 123/179.6 |
| 2006/0289457 A1 * | 12/2006 | Baecker | F23N 5/143 | 219/497 |
| 2007/0056545 A1 * | 3/2007 | Kernwein | F02P 19/027 | 123/145 A |
| 2008/0302777 A1 * | 12/2008 | Ando | H05B 3/48 | 219/270 |
| 2009/0039073 A1 * | 2/2009 | Guo | G05D 23/2401 | 219/494 |
| 2009/0151338 A1 * | 6/2009 | Li | F01N 9/00 | 60/295 |
| 2009/0183718 A1 * | 7/2009 | Casasso | F02P 19/025 | 123/623 |
| 2009/0294431 A1 * | 12/2009 | Sakurai | F02P 19/025 | 219/268 |
| 2009/0316328 A1 * | 12/2009 | Kernwein | F02P 19/025 | 361/264 |
| 2010/0283489 A1 * | 11/2010 | Kernwein | F02P 17/12 | 324/693 |
| 2013/0233272 A1 * | 9/2013 | Sackmann | F23Q 7/001 | 123/198 R |
| 2013/0238161 A1 * | 9/2013 | Sackmann | G05D 23/19 | 700/300 |
| 2016/0195056 A1 * | 7/2016 | Toyoshima | F02P 19/025 | 219/262 |

FOREIGN PATENT DOCUMENTS

| | | |
|---|---|---|
| DE | 10 2014 204 895 A1 | 10/2014 |
| DE | 10 2009 061 079 B4 | 9/2016 |
| EP | 2 940 288 A1 | 11/2015 |

* cited by examiner

METHOD FOR REGULATING THE TEMPERATURE OF A GLOW PLUG

RELATED APPLICATIONS

This application claims priority to DE 10 2017 115 946.0, filed Jul. 14, 2017, the entire disclosure of which is hereby incorporated herein by reference.

BACKGROUND

This disclosure relates to a method for regulating the temperature of a glow plug by closed-loop control.

In such methods, a target resistance is determined from a target temperature by means of a resistance temperature characteristic of the glow plug and the actual resistance of the glow plug is then regulated to the target resistance. In other words, by means of a resistance temperature characteristic, a target value of the electrical resistance is assigned to a target value of the temperature and the supply of electrical power to the glow plug is regulated such that the electrical resistance and the temperature associated with it are brought into agreement with the target value of the electrical resistance or the target value of the temperature. The quality of the temperature regulation is limited by the accuracy of the resistance temperature characteristic. It is therefore important to know the resistance temperature characteristic of the glow plug used as precisely as possible.

The resistance temperature characteristic is subject to large variations due to production, especially with ceramic glow plugs. In addition, the resistance temperature characteristic of a glow plug may change due to aging or wear.

One option for determining the resistance temperature characteristic of a glow plug is to heat the glow plug, while the motor is turned off, for a certain time, e.g., about one minute, with a constant predetermined electrical power until the glow plug reaches an equilibrium condition, the temperature of which is defined by the heat output and the heat dissipation with the engine stopped and is therefore known or can be determined by corresponding measurement for all future cases. However, this approach has the disadvantage of being very expensive.

SUMMARY

This disclosure teaches how a precise resistance temperature characteristic can be determined with little effort for the regulation of the temperature of a glow plug.

According to this disclosure, a resistance gradient is determined which is then used to determine the resistance temperature characteristic of a glow plug while the glow plug is heated. The resistance gradient may, for example, be the derivative of the resistance relative to time or the derivative of the resistance relative to the heat energy supplied. In addition, an electrical resistance of the glow plug is measured prior to the heating or at a defined time during the heating. This electrical resistance can be measured as a cold resistance prior to the heating or during the heating.

Under ideal conditions, the resistance temperature characteristic can be determined from measuring the resistance and measuring the resistance gradient. For example, if the measured resistance is the cold resistance of a glow plug of an engine which has not been operated for some time, and the temperature of the glow plug therefore corresponds to the known ambient temperature and the slope of the resistance temperature characteristic is determined from the measured resistance gradient.

Better results can usually be achieved by using the resistance gradient and a measured resistance value to adjust a given resistance temperature characteristic. The given resistance temperature characteristic may be a reference resistance temperature characteristic of a reference glow plug and, for example, may be specified by the manufacturer, perhaps to describe an ideal or average glow plug of a particular type or model. The given resistance temperature characteristic, however, may also be determined, for example, for the currently present glow plug and be adapted to compensate for aging or wear influences.

An advantageous refinement of this disclosure therefore provides that the resistance temperature characteristic is determined by means of a given resistance temperature characteristic, which is adapted using a measured resistance and the resistance gradient. With such an adaptation, a first correction value can be obtained from the measured resistance and a second correction value can be obtained from the resistance gradient. By means of these correction values, a given resistance temperature characteristic can then be adapted, for example, by taking into account the correction values additively or multiplicatively. In this case, the first correction value may be added to a given resistance temperature characteristic, and a second correction value may be used for correcting the slope of the resistance temperature characteristic.

In order to adapt a given resistance temperature characteristic, a reference heating behavior of a reference glow plug can be used, the behavior indicating the resistance profile of the reference glow plug with a defined supply of electric power, which likewise occurs in the measurement of the resistance gradient. In this case, the measured resistance can be compared with a resistance that occurs at the same time relative to the beginning of the heating with the reference heating behavior, and from which the difference of these two resistances determines the first correction value, with which the given resistance temperature characteristic is adapted. In a corresponding manner, the resistance gradient determined with the heating of the glow plug may be compared with a resistance gradient which is calculated from two resistances which occur at the same time relative to the beginning of the heating with the reference heating behavior and the second correction value can be determined from the deviation of these two resistance gradients. The resistance temperature characteristic of the glow plug can then be determined from the given resistance temperature characteristic, the first correction value and the second correction value.

In such a procedure, the measured resistance is compared with a resistance that occurs at the same time with the reference heating behavior relative to the beginning of the heating behavior, and may, for example, also be one of the two resistances with which the resistance gradient is determined.

The first correction value can also be obtained, for example, by comparing the measured cold resistance with a cold resistance determined from the given resistance temperature characteristic and determining a first correction value from the difference between the two cold resistances. In the simplest case, this difference can already be used as a correction value, for example, by adding this difference to the given resistance temperature characteristic, i.e., adding the difference to the temperature-dependent resistance value R in each case. In such a case, the given resistance temperature characteristic, which indicates, for example, the temperature as a function of the resistance, is linearly shifted by the difference.

The second correction value can also be obtained, for example, by comparing the resistance gradient determined with the heating of the glow plug with a resistance gradient of the given resistance temperature characteristic or the resistance temperature characteristic corrected using the first correction value and determining a second correction value from the deviation. In the simplest case, the deviation can be used as an additive correction term. However, it is also possible to determine the deviation from the second correction term, for example, by means of an empirical formula or table.

An advantageous refinement of this disclosure provides that the resistance gradient is determined by feeding a predetermined energy into the glow plug in a predetermined period of time and determining the difference between the electrical resistance of the glow plug at the end and at the beginning of this period of time. This period of time can be chosen freely. However, short periods of time, for example, in the order of a few 10 (tens) of milliseconds, sometimes lead to inaccurate results. The period of time is preferably at least 400 ms, particularly preferably at least 500 ms, in particular at least 600 ms, for example, 700 ms or more. Upwards, the period of time is limited by the time that is necessary to heat a cold glow plug to near its target temperature, for example, to increase its temperature by about 1000K. Therefore, the predetermined period of time is preferably not more than 1000 ms, preferably not more than 900 ms.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
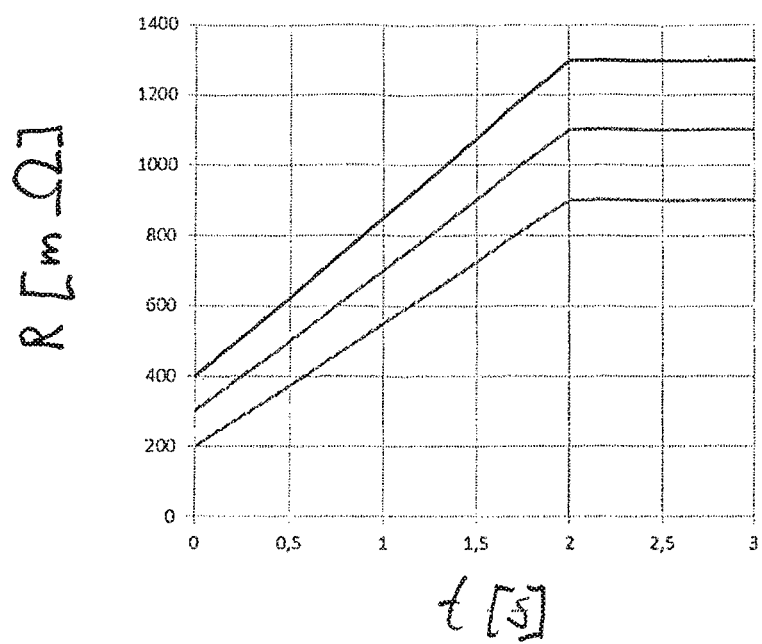
FIG. 1 shows the resistance profile of various ceramic glow plugs of the same type with the heating.

In FIG. 1, typical examples of resistance profiles of ceramic glow plugs of the same type are shown in a heating process with identical power profile. The upper line indicates resistance R as a function of time t for a glow plug at the upper edge of the tolerance or specification range, the lower line resistance R as a function of time t for a glow plug at the bottom edge of the tolerance or specification range and the middle line resistance R as a function of time t for a glow plug from the middle of the tolerance or specification range. In particular, the glow plug from the middle of the tolerance range with the middle line can be considered as a reference glow plug, which shows a reference heating behavior.

In FIG. 1, it can be clearly seen that the resistances scatter in a range of about 200 mΩ. The cold resistance of the ceramic glow plugs at the beginning of the heating process in this case is between 200 mΩ and 400 mΩ the resistance at the end of the heating process, for example, between about 1100 mΩ and 1300 mΩ.

The resistance temperature characteristic of glow plugs can be typically described as a linear function of the form $T(R)=a \cdot R+b$, wherein T is the temperature of the glow plug, R the electrical resistance of the glow plug, a and b are constants that must be determined for the respective glow plug.

Figure 2:
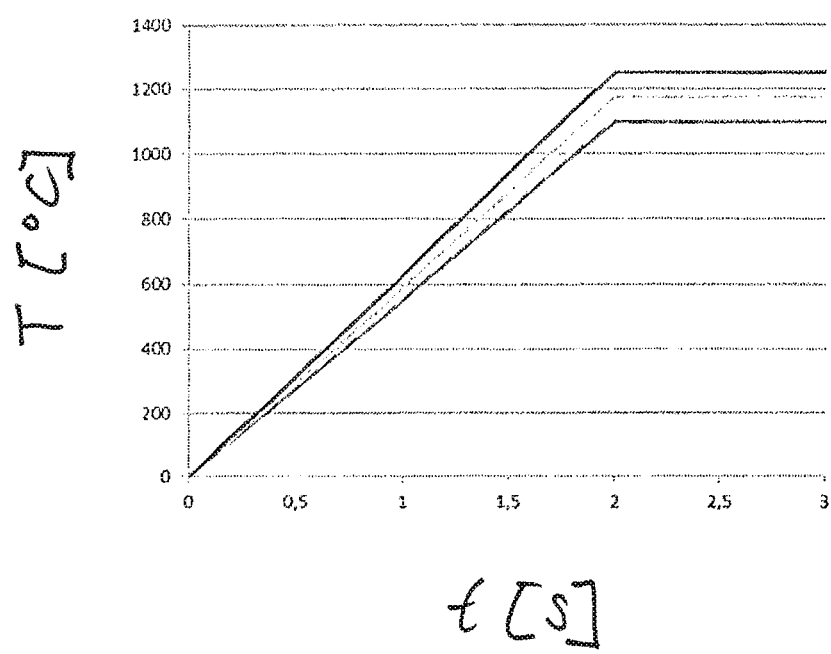
FIG. 2 shows temperature profiles which were determined from the resistance profiles shown in FIG. 1 by means of a standard resistance temperature characteristic.

A reference resistance temperature characteristic indicates the resistance temperature characteristic of a reference glow plug, e.g., an average glow plug of one type, such as, perhaps, a glow plug which is in the middle of the manufacturing tolerance or specification range. FIG. 2 shows, by way of example, temperature profiles in ° C. over time t, which were calculated from the resistance profiles shown in FIG. 1 by means of such a reference resistance temperature characteristic. As can be seen, the final temperatures determined in this way scatter about 100 K, so that a corresponding inaccuracy arises in the temperature regulation on the basis of the reference resistance temperature characteristic.

Figure 3:
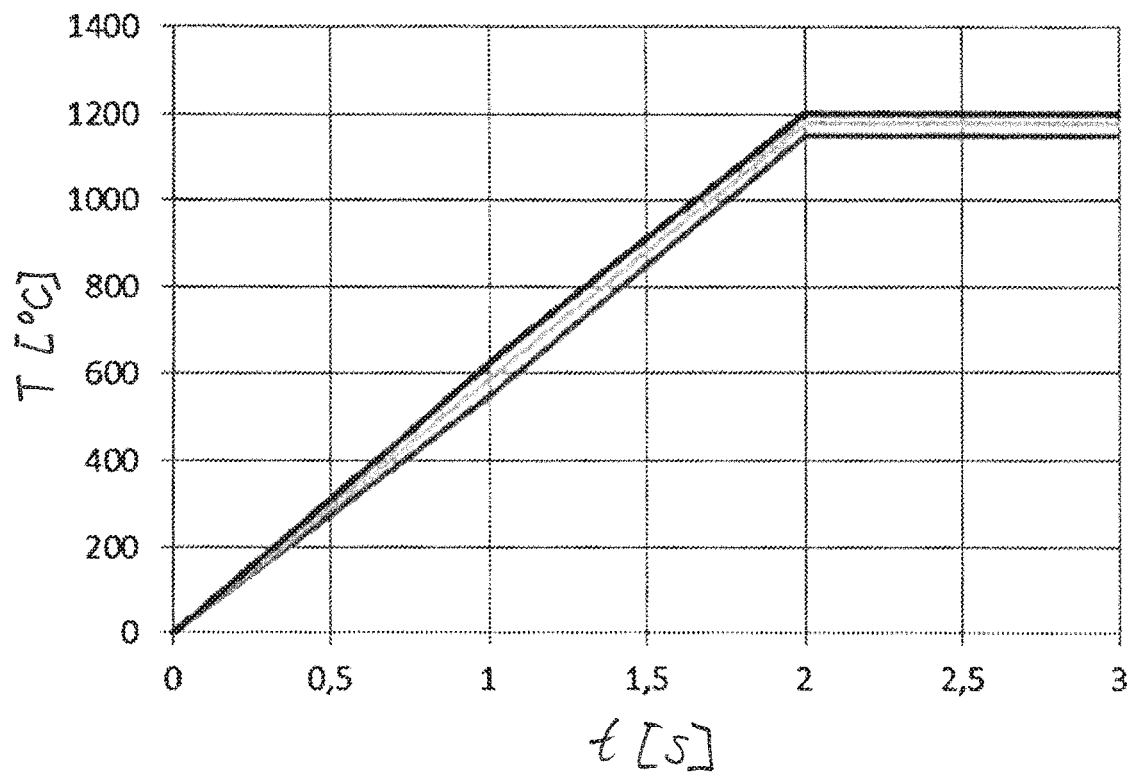
FIG. 3 shows temperature profiles which were determined from the resistance profiles shown in FIG. 1 by means of a resistance temperature characteristic determined according to the invention.
Figure 4:
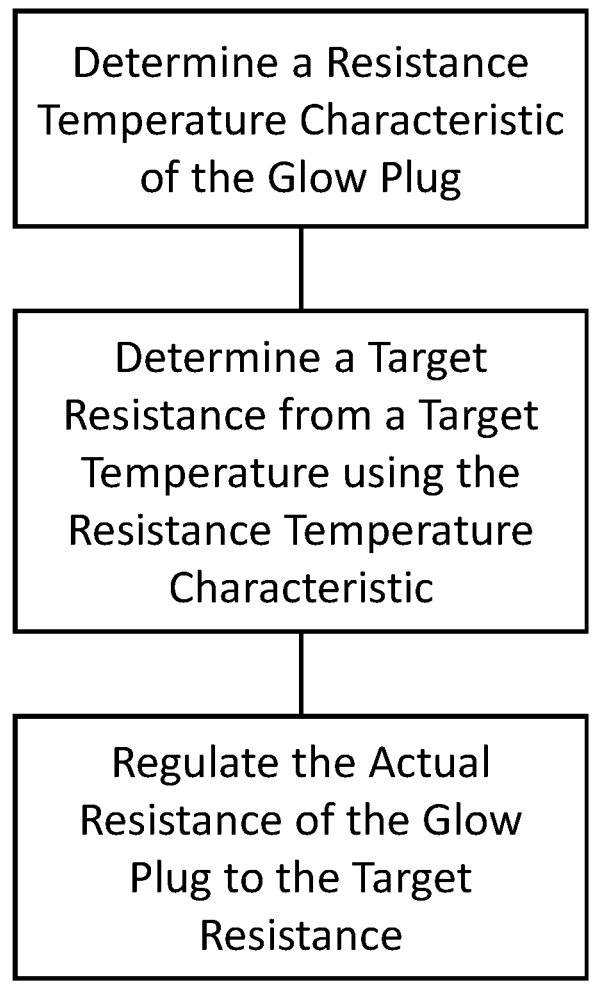
FIG. 4 is a flow chart of a method for regulating the temperature of a glow plug of an internal combustion engine.

FIG. 3 shows temperature profiles in ° C. over time t in seconds which were calculated from the resistance profiles shown in FIG. 1, using resistance temperature profiles which were determined as described below by adaptation from a given reference resistance temperature characteristic. It can be seen that the scattering of the calculated temperatures can be considerably reduced in this way, so that a much more precise temperature regulation is possible.

In order to adapt the given reference resistance temperature characteristic, the resistance profile which results for the glow plugs of FIG. 1 is considered in each case, if these are heated with a defined heating profile, thus, for example, a defined electric power is fed into the glow plugs for a defined period of time. The temperature increase accompanying a defined heating profile of an average glow plug of one type, for example, a reference glow plug, is referred to as a reference heating behavior.

In a method according to this disclosure, for example, the electrical resistance can be measured at the beginning of the heating process. If the engine has not previously been in operation for a sufficiently long time, this can be the cold resistance. In addition, the gradient of the electrical resistance is determined, for example, by feeding a predetermined energy into the glow plug in a predetermined period of time and determining the difference between the electrical resistance of the glow plug at the end and at the beginning of this period of time. For this purpose, for example, the difference in the electrical resistance at a time t1 and a time t2 can be determined and this difference can be divided by the value t2−t1. The difference between the times t2 and t1 may be 400 ms or more, for example 500 ms or more, in particular 600 ms or more. The time t1 may mark the beginning of the heating process or after the beginning of the heating process, for example, 50 ms later. The time t2 is preferably at most 1000 ms, for example, not more than 900 ms after the beginning of the heating process.

In FIG. 1, the middle line may be regarded as a resistance profile of a reference glow plug, for example, an average glow plug having resistance values in the middle of a production-related tolerance range. The electrical resistance of the glow plug to be regulated at time t0, i.e., R(t0), is compared with the resistance of a reference glow plug at the corresponding time, i.e., the resistance at time t0 with a reference heating behavior. From the difference d1 determined thereby, a first correction value can be obtained which is added to a given resistance temperature characteristic in order to adapt it to the present plug. When the given resistance temperature characteristic has the form T(R)=a·R+b, the resistance temperature characteristic adapted to the first correction value thus has the form T(R)=a·R+b+d1. In this approach, the time t0 may indicate the beginning of the heating operation or may be anywhere between t1 and t2, so that t1≤t0≤t2. These times t0, t1, t2 may be fixed times or be defined by boundary conditions, such as an amount of energy supplied. The time t0 can also be associated, for example, with a specific heating phase, that is, also before the time t1.

A second correction value is determined by comparing the resistance gradient determined for the times t1 and t2 with the resistance gradient of a reference glow plug in the reference heating behavior. A second correction value d2 can be obtained from the difference between these two resistance gradients, for example, the difference of the resistance gradients can be used directly as a second correction value.

This second correction value can also be used additively. When the given resistance temperature characteristic has the form T(R)=a·R+b, the resistance temperature characteristic adapted with the first correction value and the second correction value thus has the form T(R)=a·R+b+d1+d2.

Alternatively, the second correction value d2 may also be used multiplicatively to correct the steepness of the resistance temperature characteristic, such as in the form T(R)=(a+d2)·R+b+d1.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A method for regulating a temperature of a glow plug of an internal combustion engine, comprising:
    (a) heating the glow plug and at the same time determining a resistance gradient;
    (b) measuring an electrical resistance of the glow plug before the heating or at a defined time during the heating to obtain a measured electrical resistance;
    (c) determining a first correction value and a second correction value;
    (d) determining a resistance temperature characteristic by modifying a given resistance temperature characteristic as a function of the first and second correction values, wherein the given resistance temperature characteristic is a reference temperature characteristic corresponding to an average glow plug of the same type as the glow plug being regulated;
    (e) determining a target resistance for a target temperature as a function of the resistance temperature characteristic; and
    (f) regulating an actual resistance of the glow plug to the target resistance; and
    wherein the first correction value is a function of both the measured electrical resistance and a corresponding resistance determined from the given resistance temperature characteristic; and
    wherein the second correction value is a function of both the resistance gradient determined with the heating of the glow plug and a resistance gradient of the given resistance temperature characteristic.

2. The method according to claim 1, wherein the measured electrical resistance of the glow plug is measured as a cold resistance when the heating begins.

3. The method according to claim 1, wherein the resistance gradient is determined by feeding a predetermined energy into the glow plug in a predetermined period of time and determining the difference between the electrical resistance of the glow plug at the end and at the beginning of this period of time.

4. The method according to claim 3, wherein the predetermined period of time is at least 400 ms.

5. The method according to claim 3, wherein the predetermined period of time is at least 500 ms.

6. The method according to claim 3, wherein the predetermined period of time is at least 700 ms.

7. The method according to claim 3, wherein the predetermined period of time is not more than 1000 ms.

8. The method according to claim 3, wherein the predetermined period of time is not more than 900 ms.

9. The method according to claim 1 wherein the step of measuring the electrical resistance of the glow plug measures a cold resistance of the glow plug prior to the heating.

10. The method according to claim 1 wherein the step of measuring the electrical resistance of the glow plug is performed during the step of heating the glow plug at a defined time relative to the beginning of the heating.

11. The method according to claim 1 wherein the step of heating the glow plug and at the same time determining a resistance gradient includes taking two measurements of the electrical resistance of the glow plug and wherein one of the two measurements is used in the determination of the first correction value.

12. A method for regulating a temperature of a glow plug of an internal combustion engine, comprising:
    (a) heating the glow plug and at the same time determining a resistance gradient;
    (b) measuring an electrical resistance of the glow plug before the heating or at a defined time during the heating to obtain a measured electrical resistance; and
    (c) determining a resistance temperature characteristic by modifying a given resistance characteristic as a function of both the measured electrical resistance and the resistance gradient, wherein the given resistance temperature characteristic is a reference temperature characteristic corresponding to an average glow plug of the same type as the glow plug being regulated;
    (d) determining a target resistance for a target temperature as a function of the resistance temperature characteristic; and
    (e) regulating an actual resistance of the glow plug to the target resistance;
    wherein for determining the resistance temperature characteristic, a reference heating behavior of a reference glow plug is used to define a first reference resistance at a time in the reference heating behavior corresponding to a time of the measured electrical resistance relative to a beginning of the heating and the measured electrical resistance is compared with the reference resistance of the reference glow plug, and a first correction value is determined from the difference of the first reference resistance and the measured electrical resistance;

the resistance gradient determined with the heating of the glow plug is compared with a reference resistance gradient of the reference glow plug, wherein the reference resistance gradient is defined by a time period in the reference heating behavior corresponding to a time period used to determine the resistance gradient relative to the beginning of the heating, and a second correction value is determined from a deviation of the resistance gradient determined with the heating of the glow plug from the reference resistance gradient; and the resistance temperature characteristic of the glow plug determined in step (c) is a function of the given resistance temperature characteristic, the first correction value and the second correction value.

13. A method for regulating a temperature of a glow plug of an internal combustion engine, comprising:
(a) heating the glow plug and at the same time determining a resistance gradient;
(b) measuring an electrical resistance of the glow plug before the heating or at a defined time during the heating to obtain a measured electrical resistance; and
(c) determining a resistance temperature characteristic by modifying a given resistance temperature characteristic as a function of both the measured electrical resistance and the resistance gradient, wherein the given resistance temperature characteristic is a reference temperature characteristic corresponding to an average glow plug of the same type as the glow plug being regulated and determining the resistance temperature characteristic includes the steps of:
  (i) comparing the measured electrical resistance with a corresponding resistance which is determined from the given resistance temperature characteristic, and a first correction value is determined from the difference of the measured electrical resistance and the corresponding resistance determined from the given resistance temperature characteristic;
  (ii) comparing the resistance gradient determined with the heating of the glow plug with a resistance gradient of the given resistance temperature characteristic or the resistance temperature characteristic after being modified using the first correction value, and determining a second correction value from a deviation of the resistance gradient determined with the heating of the glow plug from the resistance gradient of the given resistance temperature characteristic or the resistance temperature characteristic after being modified using the first correction value; and
  (iii) determining the resistance temperature characteristic of the glow plug as a function of the given resistance temperature characteristic, the first correction value and the second correction value;
(d) determining a target resistance for a target temperature as a function of the resistance temperature characteristic; and
(e) regulating an actual resistance of the glow plug to the target resistance.

14. The method according to claim 12, wherein the first correction value is added to the given resistance temperature characteristic when determining the resistance temperature characteristic of the glow plug.

15. The method according to claim 12, wherein the second correction value is used to modify a slope steepness of the given resistance temperature characteristic when determining the resistance temperature characteristic of the glow plug.

* * * * *